United States Patent [19]
MacManus

[11] 3,724,417
[45] Apr. 3, 1973

[54] MACHINES FOR PRODUCING AND DEPOSITING AERATED EMULSION PRODUCTS

[76] Inventor: John MacManus, 143-16 Twenty-second Road, Whitestone, N.Y. 11357

[22] Filed: Aug. 31, 1970

[21] Appl. No.: 68,103

[30] Foreign Application Priority Data

Sept. 5, 1969 Great Britain..................44,034/69
Oct. 13, 1969 Great Britain..................50,267/69

[52] U.S. Cl...................................118/24, 118/321
[51] Int. Cl.............................................A21c 15/00
[58] Field of Search............118/13, 24, 25, 321, 500; 99/234; 107/1.7

[56] References Cited

UNITED STATES PATENTS

| | | | |
|---|---|---|---|
| 1,753,549 | 4/1930 | Cates | 118/24 |
| 2,503,673 | 4/1950 | Lindquist | 118/18 |
| 3,339,524 | 9/1967 | Benz | 118/24 |
| 3,420,210 | 1/1969 | Lindquist | 118/18 |

*Primary Examiner*—Robert W. Jenkins
*Attorney*—McCanna, Morsbach, Pillote & Muir

[57] ABSTRACT

A whipping machine has a pump that simultaneously draws in liquid product and air and forces them through a static narrow orifice homogeniser for whipping. The machine has at least one outlet nozzle arranged to discharge the whipped product downwardly onto a confection. The confection is supported on a turntable which is rotatable about a vertical axis. Various means are disclosed for providing translational movement of the turntable as it is rotated.

11 Claims, 8 Drawing Figures

PATENTED APR 3 1973 3,724,417

Inventor
John Mac Manus
By
McCanna, Mosslack, Pistle+Mein
Attorney

MACHINES FOR PRODUCING AND DEPOSITING AERATED EMULSION PRODUCTS

CROSS-REFERENCES

Reference is made to my copending application Ser. No. 883,867, filed Dec. 10, 1969 and my copending application Ser. No. 9,819, filed Feb. 9, 1970.

The invention is concerned with a machine for producing and depositing whipped cream or other stiff fluent aerated emulsion food products. The development of a new kind of whipping machine which has a pump that simultaneously draws in liquid produce and air and discharges them through a static narrow orifice homogenizer, and an improved version of which is disclosed in my copending application Ser. No. 883,867, has eliminated the need for the use of separate whipping and pumping apparatus. This is because the new machine produces a whipping emulsion produce which is extremely stable and substantially air-void free.

However, the new kind of machine does not have sufficient product output rate to enable its outlet to be fitted with a multiple star decorating head so that a pie, cake, gateau, trifle, or other confection having a diameter in excess of say 4 inches can have its whole upper surface decorated by a single pulse discharge from the machine. I conceive however that, provided the appropriate relative motion can be provided between a confection and the outlet of the machine, the whole of the top of the confection can be decorated by the machine in a single uninterrupted operation.

For this purpose in accordance with the present invention I provide a machine for producing whipped cream or other stiff, fluent aerated emulsion food products, and preferably one of the new kind referred to, with a turntable which is arranged to support a confection and is rotatably about a vertical axis, and one or more outlet nozzles which are arranged to discharge product from the machine downwardly onto a confection on the turntable throughout a range of positions differently spaced from the axis of rotation of the turntable.

With this arrangement discharge of the produce from the nozzle or nozzles onto the confection, coupled with the rotation of the confection will enable the product to be laid in rings throughout the whole of the top of the confection. If there is a single outlet nozzle, uniform relative translational movement between the nozzle and the turntable in the radial direction of the turntable a the turntable rotates uniformly will cause the product to be laid on the confection in a spiral configuration. On the other hand if there are a number of nozzles differently spaced from the axis of the turntable, both the nozzles and the axis of rotation of the turntable may be fixed and the product will be laid on the confection in concentric rings as the turntable rotates.

When there is a single nozzle, the relative translational movement may be provided by moving the nozzle over the turntable or by moving the turntable radially relatively to the fixed nozzle. In the former case the nozzle may be mounted on a flexible hose for manipulation in the radial direction relatively to the turntable by hand, or it may be mounted on an arm which swings over the turntable in the substantially radial direction. In the latter case the turntable may be rotatable on a carriage which slides in the radial direction relatively to the fixed nozzle. The relative translational movement is preferably synchronized with the rotation of the turntable. For example, when the nozzle is mounted on an arm which swings over the turntable the turntable may be connected to the arm by a simple gear train. When the turntable moves relatively to the fixed nozzle the turntable may be coupled to a pinion which follows a fixed linear rack to provide the translational movement.

The rotation of the turntable, and the relative translational movement when provided, may be produced by a motor but they may alternatively be produced by hand operation.

Manual rotation of the turntable may also be achieved by the use of a fixed linear rack and a pinion coupled to the turntable. Thus if the turntable is free to move in a guide parallel to the rack, manual drawing of the turntable assembly parallel to the rack can cause the pinion to follow the rack and the turntable to be rotated. If this arrangement is used in conjunction with a manually manipulated nozzle at the end of a flexible hose, it is desirable to be able to lay the product on the near side of the rotating confection on the turntable while the turntable is rotating in one direction, preferably from right to left for a right handed operator. To achieve this end whilst avoiding the need of wasted energy and time in returning the turntable assembly to the other end of the rack again after one confection has been decorated, there are preferably provided two opposed racks slightly further apart than the diameter of the pinion and the turntable assembly guide is arranged so that when the pinion has reached the end of one rack at the end of one decorating cycle, the assembly can be moved perpendicularly to the lengths of the racks to bring the other side of the pinion in engagement with the other rack. The assembly can then be drawn back again with the pinion in engagement with the other rack but with the turntable rotating in the same direction as before for another cycle. In order to allow for the possibility of different rates and degrees of rotation of the turntable whilst the pinion moves the length of one rack, the pinion is preferably replaceable by one of a different diameter and the rack or racks are adjustable in distance from the pinion shaft. There is then no need to make any adjustment to the turntable guide.

Whether driven by motor or hand, the cycle of product discharge from the machine is preferably also synchronized with the rotation of the turntable or the relative translational motion. If the machine is driven automatically it will be programmed to produce a cycle in which the appropriate turntable, or turntable and nozzle, movements, are provided while the product is discharged for a corresponding period. If the operation is manual, trip switches may be provided to start and stop the discharge of product, the switches being tripped by the corresponding movement of the turntable or nozzle.

When there is a single fixed outlet nozzle projecting downwards from the front of the machine, it is immaterial whether the turntable moves laterally from side to side or forwards and backwards, between its limiting positions although the first alternative is preferred since it requires less clearance of the front of the machine. In either case the outlet nozzle must be positioned at least as far forward of any obstruction of the machine, such as the front panel of its casing, a distance equal to half the diameter of a maximum sized confection to be decorated. Otherwise it will not be possible to position the confection on the turntable with the center of the confection and turntable beneath the nozzle. The normal maximum diameter for a confection is 11½ inches and the nozzle will then need to be at least 6 inches from any obstruction at the front of the machine. In the machine described in my application Ser. No. 883,867, an extension will be necessary between the electromagnetic valve, downstream of the homogenizer, and the downwardly extending auxiliary homogenizer and nozzle so that the nozzle is at least the necessary minimum 6 inches in front of the front panel on the machine casing.

The turntable may also be adjustable in height and be arranged to be set at a particular height to accommodate the corresponding height of confection beneath the nozzle.

In order that the product does not form an insightly blob on the confection at the end of a decorating cycle, provision is preferably made for vertical relative movement between the or each decorated nozzle and the turntable such that at the beginning of a decorating cycle the nozzle moves downwardly relatively to the turntable and upwardly again at the end of a cycle. This can readily be arranged when the nozzle is manually manipulated at the end of a flexible hose.

The system can be integrated into a production line by mounting a number of the rotatable turntables on a conveyor which moves past the machine. A confection on which product is to be deposited is then placed (automatically or manually) on a turntable remote from the machine and is carried to the machine along the conveyor. Preferably the conveyor is indexed discontinuously so that each turntable carrying a confection is stopped adjacent to the machine where it is rotated whilst the product is deposited on it (automatically or manually). The topped confection may then be carried on to an unloading station on the conveyor or may be removed from the turntable by the operator as soon as the topping operation has been completed.

The conveyor should be an endless one either extending in a horizontal plane around the machine in which case confections can be placed on and removed from turntables on the conveyor behind the machine; or it may have two horizontal runs one upon the other, perhaps in the manner of a ferris wheel.

When the turntable is rotated by a motor adjacent to the machine, a clutch may be provided for coupling each turntable to a common motor when it reaches the decorating position adjacent to the machine. Alternatively each turntable may have its own motor which is started and stopped either manually or automatically by means, for example, of trip switches when the turntable approaches or leaves the decorating station in front of the machine.

Some examples of machines constructed in accordance with the present invention are illustrated in the accompanying drawings, in which.

Figure 1:
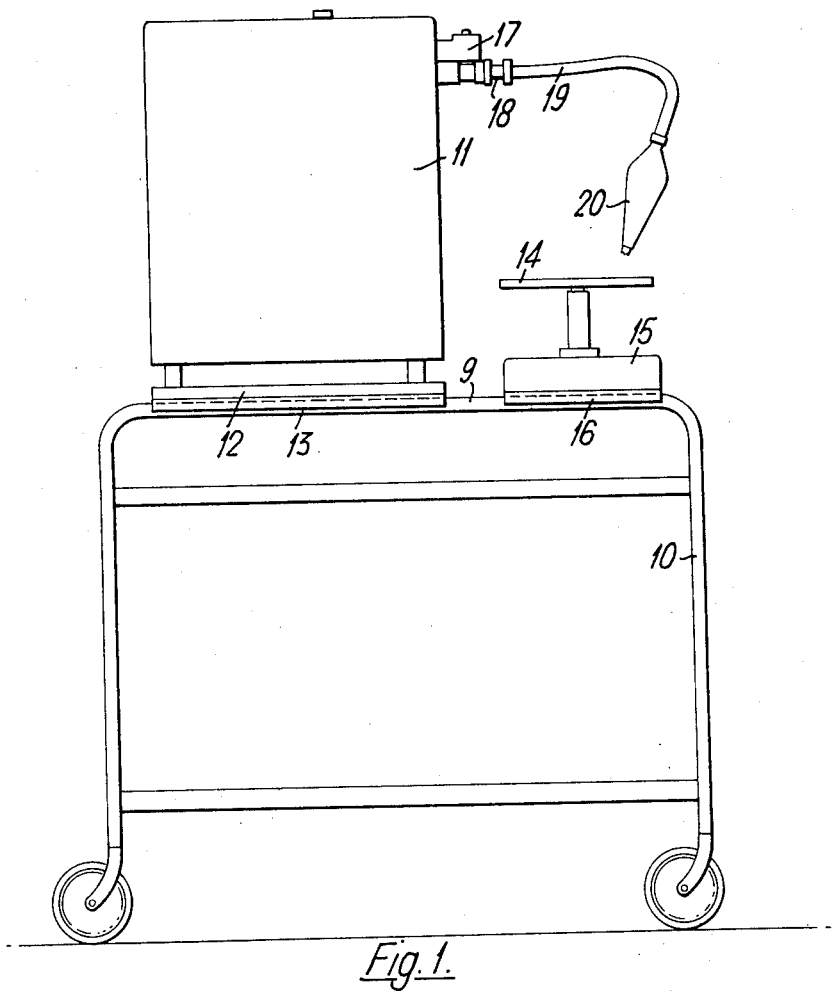
FIG. 1 is a side elevation of one example.

The machine shown in FIGS. 1 to 4 is mounted in two parts on top side rails 9 of a wheeled stainless steel trolley 10. The machine proper 11 rests on a bridge 12 having inverted channel section feet 13 which rest on the rails 9. A turntable 14 is supported from a housing 15 which also has inverted channel shaped feet 16 which rest on the rails 9.

The machine 11 is substantially identical to that described with reference to the drawings in my copending application Ser. No. 883,867, and has an unpressurized liquid product container in a refrigerated compartment and an adjustable air inlet valve. An electric motor simultaneously draws in the liquid product and air and discharges them through a static narrow orifice homogenizer and an electromagnetic shut off valve 17 to an outlet 18 which in this example is shown coupled through a flexible hose 19 to a manually manipulatable forcing bag 20 as described in my copending application Ser. No. 9,819.

If desired, for longer uninterrupted operation, the pump may draw the liquid product through a flexible hose from a bulk liquid product container mounted outside the refrigerated compartment of the machine, for example on a shelf attached to the side of the trolley 10. As described in my earlier application the machine has a complex control system which enables it to discharge whipped cream or other emulsion products continuously or to discharge a preselected portion of product. The machine may be started and stopped by means of push buttons in its front control panel or by means of a foot pedal which is at the end of a flexible lead.

Figure 2:
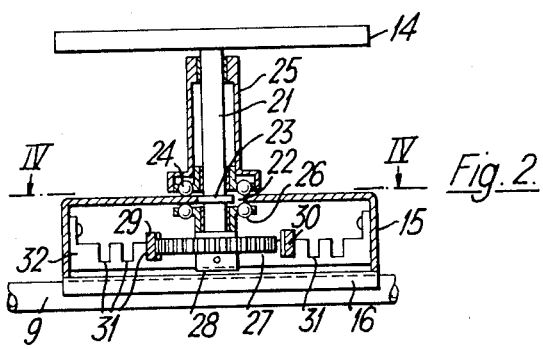
FIG. 2 is a section through part of the FIG. 1 example taken on the line II—II of FIG. 4.
Figure 4:
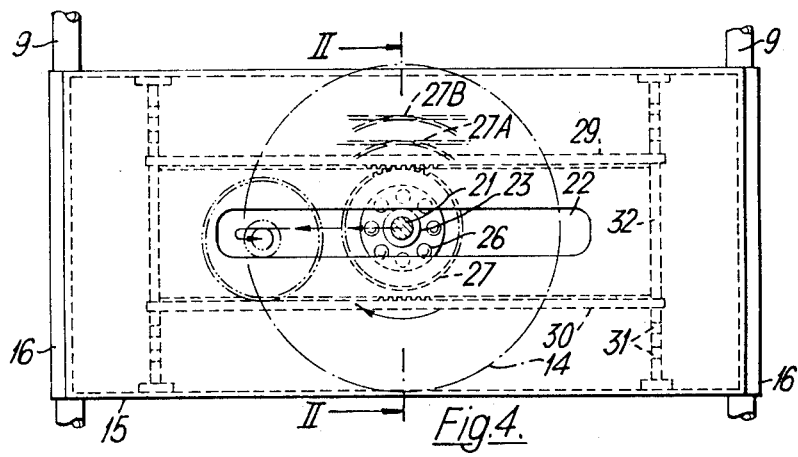
FIG. 4 is a section taken substantially on the line IV—IV in FIG. 2.

As shown, particularly in FIGS. 2 and 4, the turntable 14, which is a stainless steel disc, is rigidly supported on a shaft 21 which is guided along a slot 22 in the upper wall of the housing 15 by means of a phosphor bronze bush 23 fixed on the shaft. The inner race of a ball bearing 24, the outer race of which is fixed to a sleeve 25, is also fixed on the shaft 21 and the balls of the bearing 24 project from the bearing and run on the upper wall of the housing 15 to support the turntable during its longitudinal movement along the slot 22. The inner race of a similar bearing 26 is mounted on the shaft 21 and runs on the underside of the top wall of the housing to prevent the shaft 21 from tilting.

Figure 3:
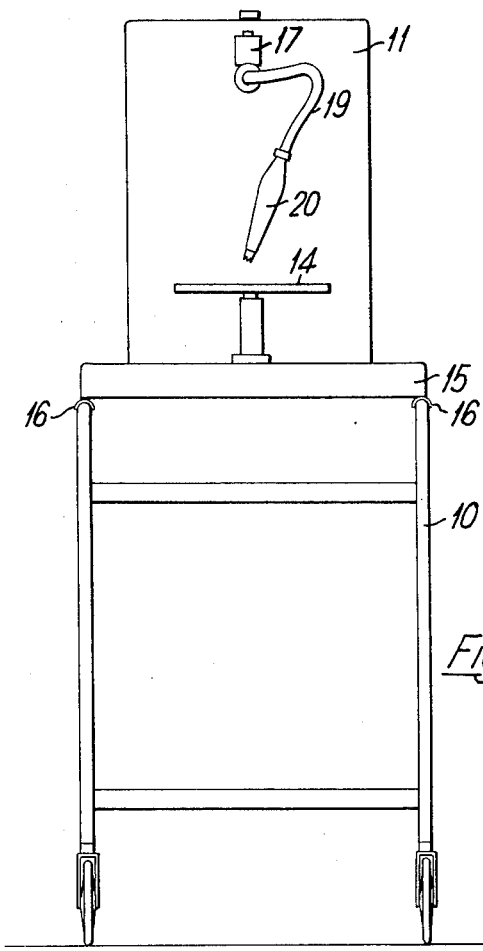
FIG. 3 is an end elevation of the first example.

At its lower end the shaft 21 has keyed on it a pinion 27 held in place by a removable bush 28. The pinion 27 cooperates with one of two racks 29 and 30 which are removably located at their ends in alternative pairs of slots 31 formed in plates 32 secured to the longer side walls of the housing 15. The arrangement is such that a right handed operator working at the right hand end of the trolley as seen in FIG. 1, grips the sleeve 25 with his left hand and urges the turntable assembly gently away from him, that is to the left in FIGS. 1 and 2, so that the bush 23 engages the left hand side of the slot 22 as seen in FIG. 2, and the pinion 27 engages the rack 29 as shown in FIGS. 2 and 4. He then draws the assembly gently to the left as seen in FIGS. 3 and 4 so that the pinion 27 is rotated by the rack 29 causing the turntable 14 to rotate in a clockwise direction as seen from above so that his nearside of the turntable and the confection on the turntable moves from right to left in front of him. He then manipulates the bag 20 with his right hand with the bag inclined downwards from right to left in front of him and lays the cream or other product on the confection in a spiral formation by moving the bag radially inwards or outwards relatively to the confection as it rotates on the turntable. Alternatively he may lay the confection in concentric rings on the confection if, after forming one ring he slightly releases the compression of his right hand on the bag 20 without stopping the machine 11 so that the bag fills up slightly but the discharge of product from the tip of the bag momentarily ceases and the, after moving the bag radially with respect to the confection, recompresses the bag gradually so that the product discharged by the machine 11 recommences to be laid on the confection. This cycle can be repeated until the appropriate number of concentric rings have been laid on the confection provided of course the bush 23 has not reached the left hand end of the slot 22 and the pinion 27 has not reached the end of the rack 29.

If the decoration of the confection has then been completed it may be removed from the turntable 14 and another confection placed on the turntable or alternatively if the decoration is incomplete the confection is left on the turntable 14. The operator then draws the turntable assembly towards him so that the pinion 27 moves out of engagement with the rack 29 and into engagement with the rack 30 and the bush 23 engages the opposite side of the slot 22. He then draws the assembly back towards the right but because the pinion 27 is now following the rack 30, the turntable continues to rotate in a clockwise direction as seen from above so that the product can still be laid in the same sense on the confection by the operator manipulating the bag 20.

If the size of the confection or the type of decoration is such that a large number of rotations of the turntable 14 are required during each cycle, a small pinion 27 is utilized and the racks 29 and 30 are laid in the innermost slots 31, both as seen in FIGS. 2 and 4. If fewer rotations per cycle are required the racks 29 and 30 are moved to the intermediate or outer slots 31 and correspondingly larger pinions 27A or 27B are fitted to the shaft 21 as indicated in FIG. 4.

Figure 5:
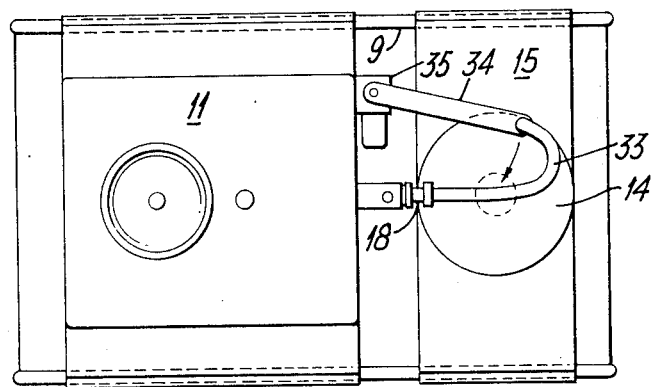
FIG. 5 is a plan of a second example.

In the FIG. 5 example the machine outlet 18 is connected by way of a flexible hose 33 to a downwardly projecting outlet nozzle which is rigidly supported by an arm 34 which is pivotally mounted from a support box 35 containing an electric motor which is arranged to reciprocate the arm 34 so that the nozzle moves substantially radially to and fro across a confection mounted on the turntable 14. In this case the turntable 14 is also rotated by means of an electric motor and the two motors are synchronized together with the pump motor of the machine 11 so that when a cycle commences the machine discharges product through the nozzle and the combined rotation of the turntable 14 and inward or outward stroke of the arm 34 cause the product to be laid in a spiral on the confection automatically and then stopped ready for the next cycle.

Figure 6:
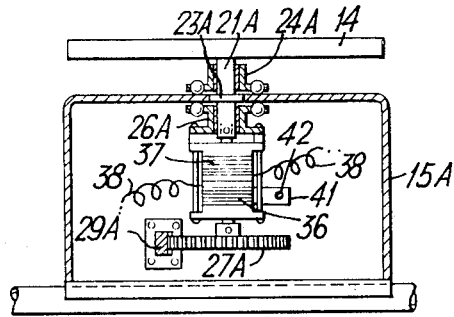
FIG. 6 is a section equivalent to FIG. 2 but of a third example.

In the FIG. 6 example, the housing 15A is larger to accommodate two electric motors 36 and 37. In this example the turntable shaft 21A is much shorter but is still supported by means of bearings 24A and 26A and a bush 23A although in this case the bush 23A substantially fills the width of the slot in the top wall of the housing 15A. A follower 41 carried by the motor 36 runs along a guide rod 42 extending parallel to the slot in the top wall of the housing for preventing the motors from rotating. The motor 37 drives the shaft 21A and rotates the turntable 14. The motor 36 carries a pinion 27A which follows a fixed rack 29A for moving the turntable assembly to and fro parallel to the slot in the housing.

With this arrangement the rotation of the turntable 14 and its radial translational movement are separately controlled and the motors 36 and 37 have infinitely adjustable speed controls available to the operator and connected to the motors through flexible leads 38. Thus in one extreme of operation the motor 36 is unenergized and the turntable 14 is rotated in one direction or the other at any desired speed by the motor 37. Alternatively, in addition to rotation of the turntable in either direction at a chosen speed, the turntable may be moved parallel to the slot in the housing by appropriate energization of the motor 36 in one direction or the other at a chosen speed.

Figure 7:
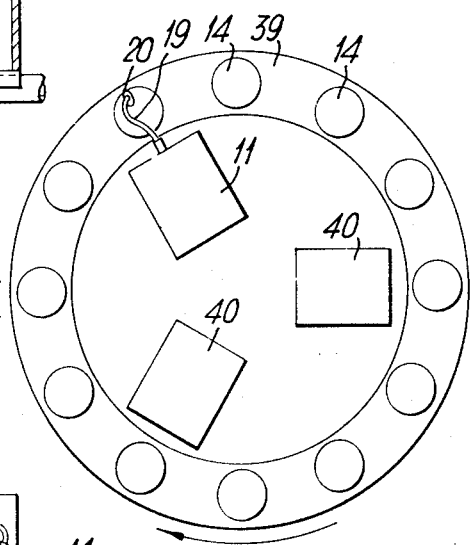
FIGS. 7 and 8 show parts of alternative production lines incorporating the machine.

FIG. 7 shows a lay out in which a number of turntables 14 are mounted on an endless driven conveyor 39 extending past a machine 11 shown in this example as being provided with a flexible hose 19 and manually manipulatable bag 20. Each turntable 14 may be rotated mechanically adjacent to the machine 11 by having a pinion which runs onto and off a common rack fixed adjacent to the machine 11 as the turntable approaches and leaves the machine. Alternatively each turntable 14 may be provided with a motor 37 for rotating it as it reaches the machine 11. The motor may be controlled manually or automatically as a result of trip switches. The conveyor 39 may be arranged to move continuously so that each turntable carrying its confection moves slowly past the decorating station adjacent to the machine 11 or it may be indexed so that each turntable rests in front of the machine 11 during a decorating cycle. FIG. 7 also shows two other machines 40 which may be similar or different to the machine 11 for carrying out some other operation on the confections as they pass between a loading and unloading station at one position on the periphery of the conveyor run.

Figure 8:
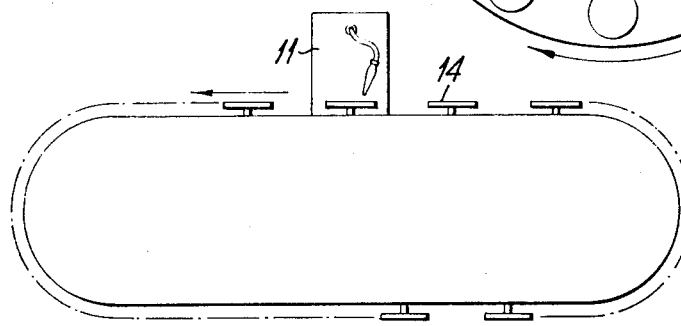

FIG. 8 shows an alternative conveyor layout in which the turntables 14 are carried in a vertical plane past the machine 11. In this case there will be a station for loading confections onto the turntables upstream of the machine 11 and an unloading station downstream of the machine. The control and operation of the turntables may however be as described with reference to FIG. 7.

In the conveyor systems of FIGS. 7 and 8, a common motor for all the turntables may be mounted adjacent to the product depositing machine with means for coupling the motor to each turntable when the turntable dwells adjacent to the machine. The common motor may be an electric motor or a variable speed air driven motor. An air motor has the advantage of being readily controlled in terms of speed and quantity. The coupling, which may involve any clutch arrangement, such as a suction cup or quick release cone clutch, may be operated automatically in the programme of the system, or it may be operated manually. For example manual coupling may be achieved by operation of a foot pedal which raises at least a driving clutch part of the motor into engagement with a driven clutch part of a turntable when in position.

I claim:

1. In a machine for producing stiff fluent aerated emulsion food products, the combination of: a turntable having a surface for supporting a confection, means mounting the turntable for rotation about a generally vertical axis, at least one outlet nozzle on the machine for discharging the aerated food product downwardly onto the confection on the turntable, and means for providing a translational movement of the turntable while the turntable is rotated for discharging the aerated food product throughout a range of positions differently spaced from the axis of rotation of the turntable.

2. The combination of claim 1 including a flexible hose having one end for receiving the aerated food product and a second end operatively connected to the outlet nozzle to feed the product thereto, whereby the outlet nozzle is arranged for manipulation in a radial direction relative to the turntable.

3. The combination of claim 2 including an arm on which the outlet nozzle is mounted, and means mounting the arm for swinging movement over the turntable in the radial direction.

4. The combination of claim 1 including an electric motor for rotating the turntable about its axis.

5. The combination of claim 1 including carriage means for translating the turntable.

6. The combination of claim 5 including a housing for supporting the turntable; and wherein the carriage means includes a guide on the housing and extending in a longitudinal direction for movement of the turntable therealong, a rack mounted on the housing generally parallel to the guide, and a pinion operatively connected to the turntable and engaged with the rack to cause rotation of the turntable about its axis as the turntable is translated.

7. The combination of claim 6 including an electric motor for rotating the pinion to drive the turntable parallel to the rack.

8. The combination of claim 6 including a handle on the turntable for moving the same parallel to the rack and cause rotation of the turntable.

9. The combination of claim 8 including a second rack mounted on the housing in opposed relation to the first rack, said racks being spaced apart a distance greater than the diameter of the pinion, and means mounting the pinion for movement perpendicular to the racks, at least when the turntable is at an end of its guide, so that the pinion can move out of engagement with one rack and into engagement with the second rack whereby when the turntable is moved in opposite directions along the guide, the turntable is rotated in the same direction.

10. The combination of claim 8 including a plurality of positioning means for selectively supporting the racks at different spaced relationships, means for removably mounting the pinion, and an additional pinion of different diameter for selectively replacing the first-named pinion, whereby the rotational speed of the turntable relative to its translational movement may be selectively altered.

11. A machine according to claim 1 including a plurality of similarly constructed turntables, an endless conveyor for carrying the turntables, and means for moving the conveyor so the turntables are moved past the outlet nozzle.

* * * * *